L. R. GINDRAT.
CLUTCH.
APPLICATION FILED APR. 21, 1915. RENEWED FEB. 8, 1918.
1,314,260.
Patented Aug. 26, 1919.
2 SHEETS—SHEET 2.
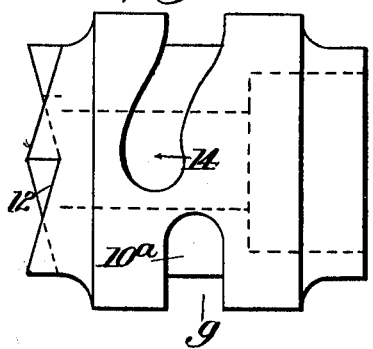
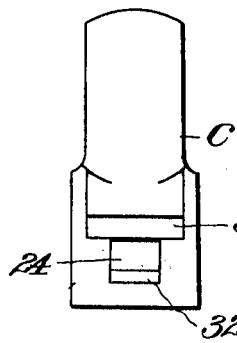
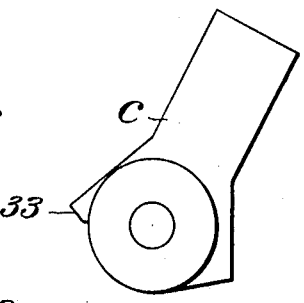
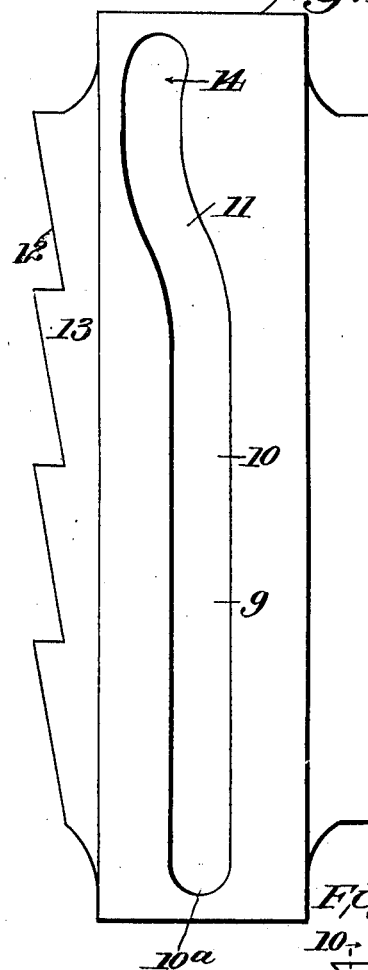
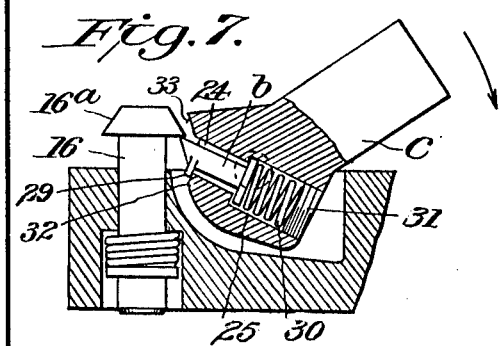
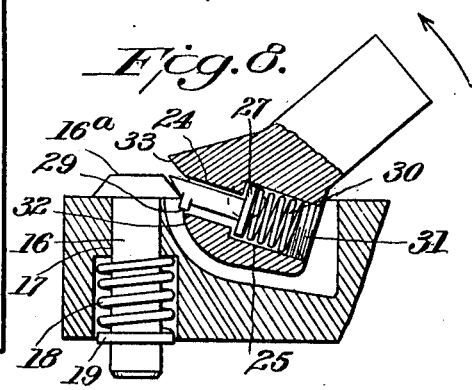
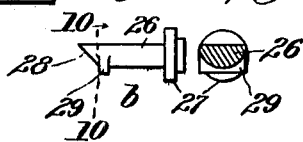
Inventor
L. R. Gindrat
By Watson Boyden
Attorneys

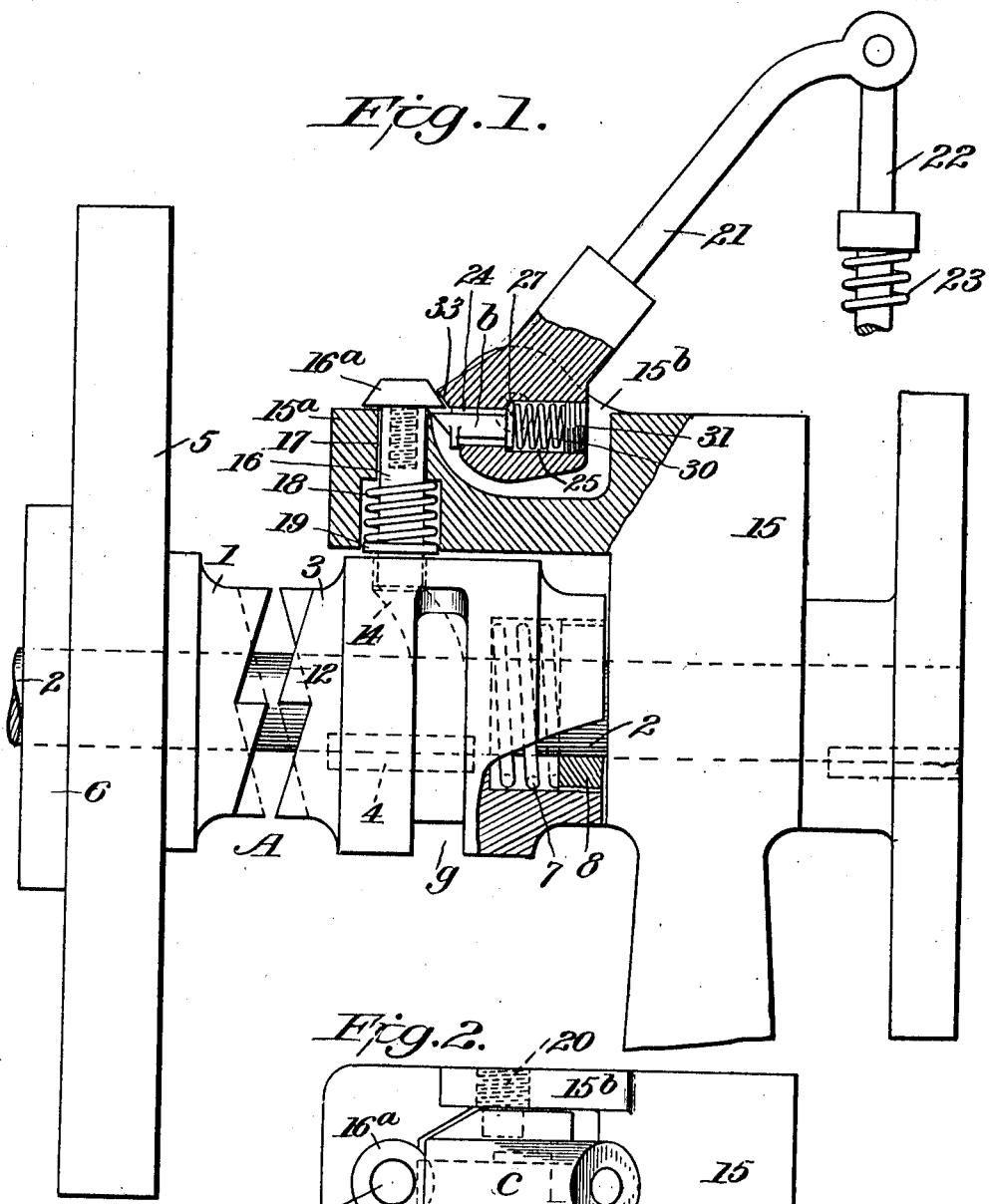

UNITED STATES PATENT OFFICE.

LOUIS R. GINDRAT, OF BALTIMORE, MARYLAND.

CLUTCH.

1,314,260.　　　Specification of Letters Patent.　　Patented Aug. 26, 1919.

Application filed April 21, 1915, Serial No. 22,876. Renewed February 8, 1918. Serial No. 216,139.

*To all whom it may concern:*

Be it known that I, LOUIS R. GINDRAT, a citizen of the United States, residing at Baltimore, in the State of Maryland, have invented certain new and useful Improvements in Clutches, of which the following is a specification.

This invention relates to improvements in clutches of the kind in which, after the engagement of the clutch members, the driven member is automatically thrown out of engagement with the driving member and stopped after the former has made a given movement, such as one revolution, and it comprises, more particularly, improvements in the tripping devices adapted to insure certainty and safety in the operation of the clutch.

The details and advantages of my invention will be clear from the accompanying drawing, in which, Figure 1 is a side elevation, partly in section, of a clutch having my improvements applied thereto;

Fig. 2 is a top plan view of the tripping pin and the rocker carrying the latch for tripping the pin;

Fig. 3 is a side elevation of the driven member of the clutch;

Fig. 4 is a development of said clutch member;

Figs. 5 and 6 are front and side views, respectively, of the rocker;

Figs. 7 and 8 are detail views of the rocker, latch and tripping pin, illustrating their operation, the rocker and its support being shown in section;

Fig. 9 is a side view of the latch; and,

Fig. 10 is a section through the latch, on the line 10—10 of Fig. 9.

Referring to the drawing, A indicates a clutch comprising a driving member 1, which is journaled upon a shaft 2, and a driven member 3, which is secured against rotation on said shaft by a suitable key 4, but is movable longitudinally on the shaft into and out of engagement with the driving member 1. The member 1 is shown connected to a fly wheel 5, journaled upon the shaft 2 and provided with a driving pulley 6, by means of which the fly wheel and clutch member 1 may be constantly driven. It will be understood that the clutch is applicable to various kinds of machinery and the driving means will vary in different machines, the fly wheel and pulley being shown merely for the purpose of illustrating a common driving attachment for the driving member of clutches of this kind. The clutch member 3 is pressed toward the clutch member 1 by a spring 7, encircling the shaft and housed within the member 3, this spring being compressed between said member and a collar 8, secured to the shaft. The driven clutch member 3 has a groove $g$, cut in its periphery and extending almost around the circumference of the member, this groove having its major portion 10 in a plane at right angles to the axis of the shaft, and having a cam portion 11, near one end, substantially parallel with the faces 12 of the teeth 13 of said member, and this groove extending slightly beyond the cam, first in a direction parallel with the part 10, and then terminating in a part 14 offset toward the part 10. A suitable bearing or support 15, through which the shaft 2 extends, has an arm 15$^a$, which overhangs the driven clutch member, and in this arm is mounted a spring pressed tripping pin 16, one end of which normally engages the end 14 of the cam groove and holds the driven member out of engagement with the driving member of the clutch. The tripping pin extends through a suitable opening 17 in the supporting arm, and a spring 18, surrounding the pin, and bearing against a collar 19 thereon, normally presses the pin toward the clutch member and holds it in the groove. It will be evident that if the pin is lifted out of the groove against the action of the spring, the driven clutch member 3 will be released and will be projected by its spring 7 into engagement with the driving clutch member 1, and if the tripping pin is immediately released after being lifted out of the end 14 of the groove, it will drop into the opposite end 10$^a$ of the groove and, as the driven member is carried around, the pin, engaging the cam surface 11, will cause the driven member to be forced out of engagement with the driving member, and the pin will then enter the end 14 of the groove and stop the rotation of the member 3. As the pin passes entirely beyond the cam portion 11 of the groove and rests in the offset part 14, the driven member will not rebound, when brought to a stop, and, in the stop position, the driven clutch member has no tendency to turn backward and reëngage the driving member, as might occur if the tripping pin engaged the cam surface of the groove in the stop position.

The tripping pin is provided with a conical head 16ª, which forms a shoulder adapted to be engaged by a latch $b$, mounted in a rocking or oscillating arm $c$. As shown, this oscillating arm is mounted on trunnions 20, extending through ears 15ᵇ on the arm 15ª, and this rocker has an extension 21 to which is pivotally connected a rod 22, adapted to be depressed by a suitable pedal against the action of a spring 23, which moves the rod upward when the pedal is released. The rocker $c$ has a slot 24 and a bore 25, meeting said slot, the bore and slot extending centrally through its lower end, adjacent, and at right angles to its axis. The latch $b$, as shown in Figs. 9 and 10, comprises a semi-cylindrical body 26, having a collar 27 at or near one end, and having its opposite end 28 beveled or inclined as shown. Immediately at the rear of the inclined end of the latch is a stop 29 which projects at right angles to the body of the latch. This latch is normally pressed toward the tripping pin or bolt by a spring 30, in the bore 25, interposed between the collar 27 and an adjusting screw 31. The collar fitting against the end of the bore serves as a stop to limit the outward movement of the latch. It will be noted that the slot 24 is larger in diameter than the body of the latch, so that the latter may play laterally in the slot, to a limited extent, and may be moved back and forth in the slot without being obstructed by the projecting shoulder 29, if the latch is raised as shown in Fig. 8. When the latch is pressed forward to its fullest extent and depressed in the slot, as shown in Figs. 1 and 2, the shoulder 29 on the latch will lock against the lip 32, beneath the slot, and backward movement of the latch will be prevented. Above the forward end of the latch, the rocker has a projection 33, adapted to extend over the inclined surface of the head or shoulder of the tripping pin when the parts are in their normal positions, as shown in Fig. 1, and to move out of the path of said head or shoulder when the rocker is turned in the direction of the arrow, Fig. 7.

The operation is as follows. The latch $b$ normally rests beneath the shoulder on the tripping pin, as shown in Fig. 1, being held in this position by the spring 23. In this position also, the projection 33 on the rocker extends over the shoulder on the pin. When the rod 22 is depressed, the rocker moves in the direction of the arrow, Fig. 7, and the latch lifts the pin out of engagement with the groove in the clutch member, the latch finally passing from under the shoulder on the pin and permitting the spring 18 to return the pin to the cam groove. During this tripping movement of the rocker, it will be noted that the latch $b$ is locked against backward movement by the shoulder 29 engaging the lip 32, so that it is impossible for the pin to be tripped prematurely by backward slipping of the latch, and the pin will necessarily be carried out of the groove at each complete tripping movement of the rocker. It will be noted also that during this tripping movement, the projection 33 on the rocker moves out of the path of the shoulder on the tripping pin so as not to interfere with the movement of the latter. When the operator releases the pedal, the spring 23 returns the rocker and latch to normal positions. As shown in Fig. 8, during this return movement of the rocker, the inclined face 28 of the latch engages the inclined face of the head or shoulder on the tripping pin, and this causes the latch to rock upwardly in the opening 24 until the stop 29 on the latch is raised out of engagement with the lip 32. The continued movement of the rocker presses the cam face of the latch against the shoulder on the pin, and the latch is thereby forced rearward until the shoulder on the pin has been passed, when it springs forward under the pin, ready for the next operation, as shown in Fig. 1. With the wearing of the pin and the end of the groove in the clutch member which the pin normally rests against, there might be a tendency for the clutch member, when coming to a stop against the pin, to force the pin outward from the groove and thus cause a second operation of the clutch with one depression of the treadle. The projection 33 on the rocker is provided in order to prevent such accidental dislodgment of the pin, through wear, or otherwise.

It will be seen that the invention provides against premature release of the tripping pin during the tripping movement of the latch, by causing the latter to be locked during the tripping movement; also, that provision is made for preventing accidental dislodgment of the tripping pin when within the groove, and also, the arrangement of the groove is such that there is no possibility of backward rotation of the driven clutch member, and consequent reëngagement of the members after the clutch has been disengaged.

While I have shown my invention in connection with one form of clutch, it will be evident that it is applicable to various well known types of one-revolution clutches, and I do not wish to limit the claims to any particular type. In the type of clutch shown, the teeth will preferably have their meeting faces cut spirally, although shown straight, and the cam in the groove will also be cut spirally parallel with the faces of the teeth.

What I claim is:

1. The combination with a clutch and a tripping device normally engaging one member thereof, said device having a shoulder, of a rocker pivotally mounted adjacent the tripping device, a latch in sliding engagement with said rocker for engaging said shoulder and tripping said device, and means for locking said latch against sliding movement during the tripping movement of the rocker.

2. The combination with a clutch and a tripping pin normally engaging one member thereof, said pin having a conical head, of a rocker pivoted adjacent the pin, and a latch sliding in the rocker and adapted to engage the head of the pin.

3. The combination with a clutch and a tripping device normally engaging one member thereof, said device having a shoulder, of means for operating the tripping device comprising a rocker, a latch carried thereby and adapted to engage said shoulder, said latch and rocker having parts adapted to interlock and prevent backward movement of the latch during the tripping movement of the rocker.

4. The combination with a clutch, and a tripping device normally engaging one member thereof, said device having a shoulder, of a rocker, a latch in sliding engagement with the rocker and adapted to slip past the shoulder during one movement of the rocker and to positively engage the shoulder during the opposite movement of the rocker, said latch and rocker having parts adapted to interlock during the latter movement.

5. The combination with a clutch and a tripping device normally engaging one member thereof, said device having a shoulder, of a rocker having a slot, a spring latch movable longitudinally and laterally in the slot by engagement with said shoulder as the rocker is moved, said latch having a part adapted to interlock with the rocker to prevent sliding movement of the latch in one of its lateral positions, and to become unlocked in its opposite lateral position to permit sliding movement of the latch.

6. The combination with a clutch and a tripping device normally engaging one member thereof, said device having a shoulder, of a rocker having a part adapted to project over the shoulder, and a latch carried by the rocker and adapted to project under the shoulder, said latch adapted to positively engage the shoulder during the tripping movement of the rocker and to slip past the shoulder during the return movement of the rocker.

7. A clutch comprising a member having an annular groove with a cam portion adjacent one end, the latter end portion extending a short distance beyond the cam, in combination with a tripping device normally engaging said latter end, and means for tripping said device.

8. A clutch comprising a member having an annular groove with a cam portion adjacent one end, the latter end being offset in a direction away from the engaging face of said member, in combination with a tripping device normally engaging said latter end, and means for tripping said device.

9. A clutch comprising a member having an annular groove with a cam portion adjacent one end, said latter end portion extending a short distance substantially parallel with the engaging face of the member and terminating in a part offset in a direction away from said face, in combination with a tripping device normally engaging said latter end, and means for tripping said device.

In testimony whereof I have affixed my signature.

LOUIS R. GINDRAT.

Copies of this patent may be obtained for five cents each, by addressing the "Commissioner of Patents, Washington, D. C."